(12) United States Patent
Hughes

(10) Patent No.: US 6,704,577 B1
(45) Date of Patent: Mar. 9, 2004

(54) EFFICIENT SEARCHING BY A REMOTE UNIT IN A SLOTTED MODE COMMUNICATION SYSTEM

(75) Inventor: Robbin Hughes, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/540,800

(22) Filed: Mar. 31, 2000

(51) Int. Cl.[7] .......................... H04Q 7/20; H04B 7/216
(52) U.S. Cl. ...................... 455/515; 455/436; 455/574; 370/335; 370/350
(58) Field of Search ................................. 455/334, 343, 455/434, 436, 437, 442, 67.1, 67.3, 65, 574, 515, 516, 517, 464; 370/311, 335, 348, 331, 332, 342, 328, 329, 350

(56) References Cited

U.S. PATENT DOCUMENTS

| | | | |
|---|---|---|---|
| 5,867,527 A | | 2/1999 | Ziv et al. |
| 5,920,549 A | | 7/1999 | Bruckert et al. |
| 6,278,703 B1 | * | 8/2001 | Neufeld ........................ 370/342 |
| 6,356,538 B1 | * | 3/2002 | Li ............................... 370/311 |

FOREIGN PATENT DOCUMENTS

WO 9638936 12/1996

* cited by examiner

*Primary Examiner*—Erika Gary
(74) *Attorney, Agent, or Firm*—Philip R. Wadsworth; Charles D. Brown; George C. Pappas

(57) ABSTRACT

A method and apparatus for improving search efficiency in a remote unit of a slotted mode, wireless communication system. In a slotted mode communication system the remote unit is in an "active state" only during its assigned slot. A controller in the remote unit passes a selected set of search parameters to a search engine at the beginning of the assigned slot. The search engine performs a search, using the selected set of search parameters, and stores the search results. The controller then immediately passes another set of search parameters to the search engine for the next search without evaluating the results of the just completed search. Searching continues as long as the remote unit is in its assigned slot. When the remote unit enters the inactive state the controller evaluates the results of the searches performed during the active state. Evaluation of the search results provides a basis for the controller to generate new sets of search parameters to be used during the next active state of the remote unit.

21 Claims, 7 Drawing Sheets

EFFICIENT SEARCHING BY A REMOTE UNIT IN A SLOTTED MODE COMMUNICATION SYSTEM

RELATED APPLICATIONS

The following U.S. patent applications filed concurrently herewith, are related to this application and are hereby incorporated by reference in their entirety: REACQUISITION AND HANDOFF IN A SLOTTED MODE COMMUNICATION SYSTEM, U.S. patent application Ser. No. 09/540,801; FAST ACQUISITION OF A PILOT SIGNAL IN A WIRELESS COMMUNICATION DEVICE, U.S. patent application Ser. No. 09/540,128; and PRIORITIZATION OF SEARCHING BY A REMOTE UNIT IN A WIRELESS COMMUNICATION SYSTEM, U.S. patent application Ser. No. 09/540,802.

FIELD OF THE INVENTION

The invention relates to wireless communications systems. In particular, the invention relates to acquisition of a pilot signal in a wireless communication system.

BACKGROUND OF THE INVENTION

A wireless communication system may comprise multiple remote units and multiple base stations. FIG. 1 exemplifies an embodiment of a terrestrial wireless communication system with three remote units 10A, 10B and 10C and two base stations 12. In FIG. 1, the three remote units are shown as a mobile telephone unit installed in a car 10A, a portable computer remote 10B, and a fixed location unit 10C such as might be found in a wireless local loop or meter reading system. Remote units may be any type of communication unit such as, for example, hand-held personal communication system units, portable data units such as a personal data assistant, or fixed location data units such as meter reading equipment. FIG. 1 shows a forward link 14 from the base station 12 to the remote units 10 and a reverse link 16 from the remote units 10 to the base stations 12.

Communication between remote units and base stations, over the wireless channel, can be accomplished using one of a variety of multiple access techniques which facilitate a large number of users in a limited frequency spectrum. These multiple access techniques include time division multiple access (TDMA), frequency division multiple access (FDMA), and code division multiple access (CDMA). An industry standard for CDMA is set forth in the TIA/EIA Interim Standard entitled "Mobile Station—Base Station Compatibility Standard for Dual-Mode Wideband Spread Spectrum Cellular System", TIA/EIA/IS-95, and its progeny (collectively referred to here as IS-95), the contents of which are incorporated by reference herein in their entirety. Additional information concerning a CDMA communication system is disclosed in U.S. Pat. No. 4,901,307, entitled SPREAD SPECTRUM MULTIPLE ACCESS COMMUNICATION SYSTEM USING SATELLITE OR TERRESTRIAL REPEATERS, (the '307 patent) assigned to the assignee of the present invention and incorporated in its entirety herein by reference.

In the '307 patent, a multiple access technique is disclosed where a large number of mobile telephone system users, each having a transceiver, communicate through base stations using CDMA spread spectrum communication signals. The CDMA modulation techniques disclosed in the '307 patent offer many advantages over other modulation techniques used in wireless communication systems such as TDMA and FDMA. For example, CDMA permits the frequency spectrum to be reused multiple times, thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In a wireless communication system, a signal may travel several distinct propagation paths as it propagates between base stations and remote units. The multipath signal generated by the characteristics of the wireless channel presents a challenge to the communication system. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the wireless channel, the multipath is created by reflection of the signal from obstacles in the environment such as, for example, buildings, trees, cars, and people. Accordingly, the wireless channel is generally a time varying multipath channel due to the relative motion of the structures that create the multipath. For example, if an ideal impulse is transmitted over the time varying multipath channel, the received stream of pulses changes in time delay, attenuation, and phase as a function of the time that the ideal impulse is transmitted.

The multipath characteristics of a channel can affect the signal received by the remote unit and result in, among other things, fading of the signal. Fading is the result of the phasing characteristics of the multipath channel. A fade occurs when multipath vectors add destructively, yielding a received signal that is smaller in amplitude than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\pi$ radians, no signal is received at the output of the channel because the two signals, being equal amplitude and opposite phase, cancel each other. Thus, fading may have a severe negative effect on the performance of a wireless communication system.

A CDMA communication system is optimized for operation in a multipath environment. For example, the forward link and reverse link signals are modulated with a high frequency pseudonoise (PN) sequence. The PN modulation allows the many different multipath instances of the same signal to be separately received through the use of a "rake" receiver design. In a rake receiver, each element within a set of demodulation elements can be assigned to an individual multipath instance of a signal. The demodulated outputs of the demodulation elements are then combined to generate a combined signal. Thus, all of the multipath signal instances must fade together before the combined signal experiences a deep fade.

In a communication system based on the industry standard for CDMA, IS-95, each of the multiple base stations transmits a pilot signal having a common PN sequence. Each base station transmits the pilot signal offset in time from neighboring base stations so that the signals can be distinguished from one another at the remote unit. At any given time, the remote unit may receive a variety of pilot signals from multiple base stations. Using a copy of the PN sequence produced by a local PN generator, the entire PN space can be searched by the remote unit. Using the search results, the controller distinguishes pilot signals from multiple base stations based on the time offset.

In the remote unit, a controller is used to assign demodulation elements to the available multipath signal instances. A search engine is used to provide data to the controller concerning the multipath components of the received signal. The search engine measures the arrival time and amplitude of the multipath components of a pilot signal transmitted by the base stations. The effect of the multipath environment on the pilot signal and the data signal transmitted by a common base station is very similar because the signals travel through the same channel at the same time. Therefore, determining the multipath environment's effect on the pilot signal allows the controller to assign demodulation elements to the data channel multipath signal instances.

The search engine determines the multipath components of the pilot signals of base stations in the proximity of the remote unit by searching through a sequence of potential PN offsets and measuring the energy of the pilot signal received at each of the potential PN offsets. The controller evaluates the energy associated with a potential offset, and, if it exceeds a threshold, assigns a signal demodulation element to that offset. A method and apparatus of demodulation element assignment based on searcher energy levels is disclosed in U.S. Pat. No. 5,490,165 entitled DEMODULATION ELEMENT ASSIGNMENT IN A SYSTEM CAPABLE OF RECEIVING MULTIPLE SIGNALS, (the '165 patent) assigned to the assignee of the present invention.

FIG. 2 shows an exemplifying set of multipath signal instances of a single pilot signal from a base station arriving at a remote unit. The vertical axis represents the power received in decibels (dB). The horizontal axis represents the delay in the arrival time of a signal instance due to multipath delays. The axis (not shown) going into the page represents a segment of time. Each signal spike in the common plane of the page has arrived at the remote unit at a common time but has been transmitted by the base station at a different time. Each signal spike 22–27 has traveled a different path and therefore exhibits a different time delay, a different amplitude, and a different phase response. The six different signal spikes represented by spikes 22–27 are representative of a severe multipath environment. A typical urban environment produces fewer usable paths. The noise floor of the system is represented by the peaks and dips having lower energy levels. The task of the search engine is to identify the delay, as measured by the horizontal axis, and amplitude, as measured by the vertical axis, of signal spikes 22–27 for potential demodulation element assignment.

Note, as shown in FIG. 2, each of the multipath peaks varies in amplitude as a function of time as shown by the uneven ridge of each multipath peak. In the limited time shown, there are no major changes in the multipath peaks. Over a more extended time range, multipath peaks disappear and new paths are created as time progresses. Multipath peaks are likely to merge together or blur into a wide peak over time.

Typically, the operation of the search engine is overseen by a controller. The controller commands the search engine to step through a set of offsets, called a search window, that is likely to contain one or more multipath signal peaks suitable for assignment to a demodulation element. For each offset, the search engine reports the energy it found offset back to the controller. Demodulation elements may then be assigned by the controller to the paths identified by the search engine (i.e. the timing reference of their PN generators is aligned with the timing of the identified path). Once a demodulation element has locked onto the signal, it then tracks that path on its own without controller supervision, until the path fades away or until the demodulation element is assigned to another path by the controller.

As noted above, each base station in a given geographical area is assigned a sequence offset of a common PN pilot sequence. For example, according to IS-95, a PN sequence having $2^{15}$ chips and repeating every 26.66 milliseconds (ms) is transmitted by each base station in the system at one of 512 PN sequence offsets as a pilot signal. According to IS-95 operation, the base stations continually transmit the pilot signal which can be used by the remote unit to identify the base station as well as other functions, such as for example, determining the multipath environment the remote unit is operating in and synchronization of remote unit timing to the base station timing.

During initial power on, or any other situation when the remote unit has lost a pilot signal such as when performing a hard hand-off to a different operating frequency, the remote unit evaluates all possible PN offsets of the pilot PN sequence. Typically, a search engine measures the pilot signal strength at all possible PN offsets, proceeding at a measurement rate that produces an accurate measure of the pilot signal present at the corresponding offset. Proceeding in this manner, the search engine determines the PN offset of base stations which are geographically near the remote unit. Searching each PN offset in this manner can take anywhere from hundreds of milliseconds to a few seconds depending on the channel conditions during acquisition. This amount of time for the remote unit to reacquire a pilot signal is detrimental to the remote unit operation, and may be annoying to the user of the remote unit.

FIG. 3 shows an extended portion of PN space on the horizontal axis. The groups of peaks 30, 32 and 34 represent transmissions from three different base stations. As shown, the signal from each base station signal experiences a different multipath environment. Also, each base station has a different PN offset from the PN reference 36. Thus, the controller may select a set of PN offsets corresponding to search windows for any of the identified base stations. This allows the remote unit to simultaneously demodulate signals from multiple base stations by assigning demodulation elements appropriately.

In a typical CDMA communication system, remote units sporadically establish bi-directional communications with a base station. For example, a cellular telephone remains idle for significant periods of time when no call is in process. However, to ensure that any message directed to a remote unit is received, the remote unit continuously monitors the communication channel, even while it is idle. For example, while idle, the remote unit monitors the forward link channel from the base station to detect incoming calls. During such idle periods, the cellular telephone continues to consume power to sustain the elements necessary to monitor for signals from the base stations. Many remote units are portable and are powered by an internal battery. For example, personal communication system (PCS) handsets are almost exclusively battery-powered. The consumption of battery resources by the remote unit in idle mode decreases the battery resources available to the remote unit when a call is placed or received. Therefore, it is desirable to minimize power consumption in a remote unit in the idle state and thereby increase battery life.

One means of reducing remote unit power consumption in a communication system is disclosed in U.S. Pat. No. 5,392,287, entitled APPARATUS AND METHOD FOR REDUCING POWER CONSUMPTION IN A MOBILE COMMUNICATION RECEIVER (the '287 patent), assigned to the assignee of the present invention and hereby incorporated in its entirety herein by reference. In the '287 patent, a technique for reducing power consumption in a remote unit operating in an idle mode (i.e. a remote unit which is not engaged in bidirectional communication with a base station) is disclosed. In idle, each remote unit periodically enters an "active" state during which it prepares to and receives messages on a forward link communication channel. In the time period between successive active states, the remote unit enters an "inactive" state. During the remote unit's inactive state, the base station does not send any messages to that remote unit, although it may send messages to other remote units in the system that are in the active state.

As disclosed in the '287 patent, a base station broadcasts messages which are received by all remote units within the base station coverage area on a "paging channel." All idle remote units within the base station coverage area monitor the paging channel. The paging channel is divided in the time dimension into a continuous stream of "slots." Each remote unit operating in slotted mode monitors only specific slots which have been assigned to it as assigned slots. The paging channel continually transmits messages in numbered slots, repeating the slot sequence, such as for example, every 640 slots. When a remote unit enters the coverage area of a base station, or if a remote unit is initially powered on, it communicates its presence to a preferred base station. Typically the preferred base station is the base station which has the strongest pilot signal as measured by the remote unit.

The preferred base station, along with a plurality of geographically near neighboring base stations, assign a slot, or a plurality of slots, within their respective paging channels, for the remote unit to monitor. The base station uses the slots in the paging channel to transmit control information to a remote unit, if necessary. The remote unit may also monitor a timing signal from the preferred base station allowing the remote unit to align, in the time dimension, to the base station slot timing. By aligning in the time dimension to the preferred base station slot timing, the remote unit can determine when a paging channel slot sequence begins. Thus, knowing when the paging channel slot sequence begins, which slots are assigned for it to monitor, the total number of slots in the repetitive paging channel sequence of slots, and the period of each slot, the remote unit is able to determine when its assigned slots occur.

Generally, the remote unit is in the inactive state while the base station is transmitting on the paging channel in slots which are not within the remote unit's assigned set. While in the inactive state, the remote unit does not monitor timing signals transmitted by the base station, maintaining slot timing using an internal clock source. Additionally, while in the inactive state the remote unit may remove power from selected circuitry, such as, for example, circuits which monitor pilot signals transmitted by base stations to detect changes in the wireless channel including the search engine. Using its internal timing, the remote unit transits to its active state a short period of time before the next occurrence of an assigned slot.

When transiting to the active state, the remote unit applies power to circuitry that monitors the wireless channel, including the search engine. The search engine is used to reacquire the preferred base station's pilot signal and to detect changes in the wireless channel which may have occurred due to the movement of the remote unit or to the movement of objects within the coverage area of the base station. In addition to reacquiring the pilot signal, the remote unit may perform any other actions or initializations in preparation of receiving a message at the beginning of its assigned slot.

When the remote unit enters the active state, it may receive messages in its assigned slots in the paging channel and respond to commands from the base station. For example, the remote unit may be commanded to activate a "traffic" channel to establish a bidirectional communication link for conducting subsequent voice communication in response to an incoming call. If there is no message from the base station, or no command requesting the remote unit to remain active, at the end of the assigned slot the remote unit returns to the inactive state. In addition, the remote unit returns to the inactive state immediately if commanded to do so by the base station.

During its assigned slot, the remote unit's search engine measures the pilot signal strength of the preferred base station as well as the pilot signal strengths of neighboring base stations. If the remote unit relocates from the coverage area of one base station to another neighboring base station's coverage area, the remote unit needs to "hand-off" to the neighboring base station. A hand-off occurs when the transmitted pilot signal strength of a neighbor base station becomes sufficiently stronger than the preferred base station. When this occurs, the neighboring base station is assigned as the preferred base station. Following a hand-off, in the next active state, the remote unit monitors the paging channel of the new preferred base station to receive messages and commands.

In addition to providing data for determining when a hand-off should occur, searches of the preferred base station's pilot signal allow the remote unit to make adjustments to compensate for changes in the multipath environment.

For example, if one of the multipath signal instances weakens to the point that it is unusable, the remote unit may reassign demodulation elements accordingly.

Knowing the nominal PN offset of the preferred base station as well as a neighboring set of base stations, typically, the controller passes a set of search parameters to the search engine specifying PN offsets at which multipath signal instances of pilot signals are likely to be found. At the completion of the search, the search engine passes the search results to the controller. The controller analyzes the search results and selects a set of search parameters for the next search. Following selection of the new search parameters, the controller passes the parameters to the search engine and the search process is repeated. This process is repeated until the remote unit once again enters the inactive idle state.

Because searches occur only during the remote unit assigned slot, a limited time period is available for the searches to be performed. Increasing the number of searches performed by a remote unit would improve its ability to determine when a hand-off should occur, as well as providing more information about the multipath environment of the preferred base station, leading to a more robust communication system. However, remaining in the active state for a longer duration consumes more power and reduces the battery life of the remote unit.

Therefore, there is a need in the art for a method and apparatus to increase the efficiency and accuracy of the searching process of the remote unit without significantly increasing the power consumption.

SUMMARY OF THE INVENTION

The invention comprises a method and apparatus for searching in a remote unit, which provides for improved search efficiency in a slotted mode, wireless, communication system. In a slotted mode communication system, the remote unit may alternate between "active" and "inactive" states to prolong battery life. In such a system, the remote unit enters the active state just prior to its assigned slot, returning to the inactive state following its assigned slot.

In one embodiment of the invention, the number of searches performed during an active state are increased by not evaluating the search results while the remote unit is in the active state. In this embodiment, a controller in the remote unit passes a selected set of search parameters to a search engine at the beginning of the assigned slot. The search engine performs a search, using the selected set of search parameters, and stores the search results in a data array. Immediately following completion of a search, the search engine interrupts the controller indicating the search is complete. Rather than first evaluating the results of the search to determine new search parameters, the controller immediately passes another set of search parameters to the search engine for the next search. Searching continues as long as the remote unit is in the active state. When the remote unit's assigned slot has ended, or if commanded by the base station, the remote unit leaves the active state and enters the inactive state. During the inactive state the remote unit removes power from selected circuitry, thereby extending battery life. In addition, while in the inactive state the controller evaluates the results of the searches performed during the assigned slot of the previous active state. Evaluation of the search results provides a basis for the controller to generate new sets of search parameters for use by the search engine during a subsequent active state.

In another embodiment, the controller passes the search parameter sets to the search engine during a preparation period after the remote unit has reacquired the preferred base station. The preparation period occurs after the remote unit has entered its active state prior to its assigned slot. The search engine may then begin searching prior to occurrence of the remote unit's assigned slot, thereby increasing the period available for searching, and increasing the number of searches that may be performed.

In yet another embodiment, a plurality of sets of search parameters are passed from the controller to the search engine during the preparation period or at the beginning of the assigned slot. In this embodiment, the search engine completes a search, stores the search results, and then proceeds to the next search without receiving additional commands from the controller. The search engine continues searching as long as the remote unit remains in the active state.

In one embodiment, after the remote unit enters the inactive state, the controller evaluates the stored search results. Following evaluation of the search results the remote unit remains in the inactive state unit the occurrence of its next active state. In another embodiment, after evaluation of the stored search results and the determination of a new set of search parameters, the controller enters a "more inactive state." In the "more inactive state" additional circuitry in the remote unit has power removed, in addition to the circuitry which has had power removed in the inactive state. For example, after the controller has read the search results from memory, the memory may enter an inactive state in which it consumes less power. In addition, after the controller has evaluated the search results from the previous active state and selected new search parameters to be used during the subsequent active state, the controller may also become inactive until the next active state of the remote unit is entered. Removing power from additional circuitry further decreases power consumption in a remote unit and thereby increases battery life.

BRIEF DESCRIPTION OF THE DRAWINGS

The features, objects and advantages of the present invention will become more apparent from the detailed description set forth below when taken in conjunction with the drawings in which like references characters identify correspondingly throughout, and wherein.

DETAILED DESCRIPTION OF THE INVENTION

Figure 1:
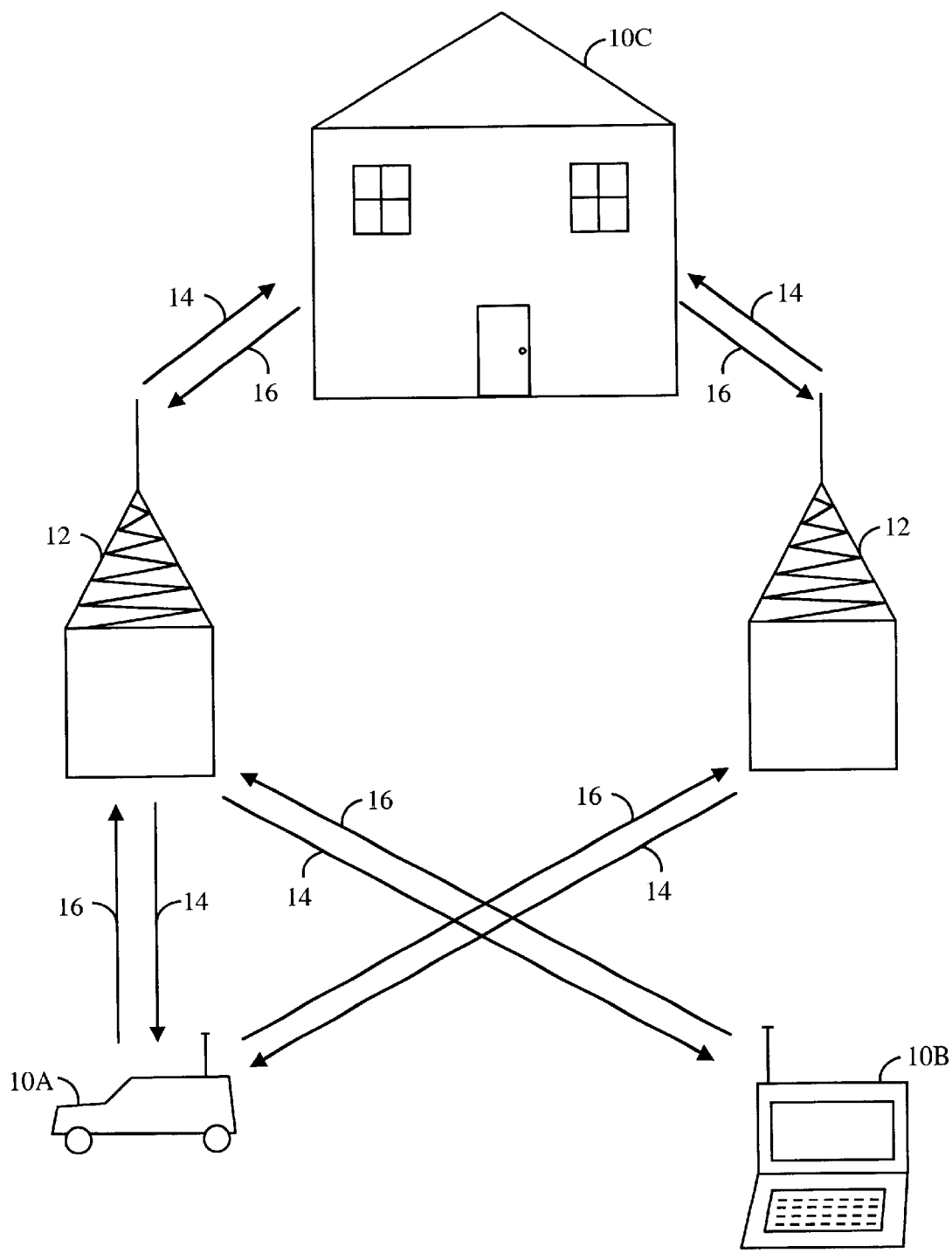
FIG. 1 is a representative diagram showing a typical modern wireless communication system.
Figure 2:
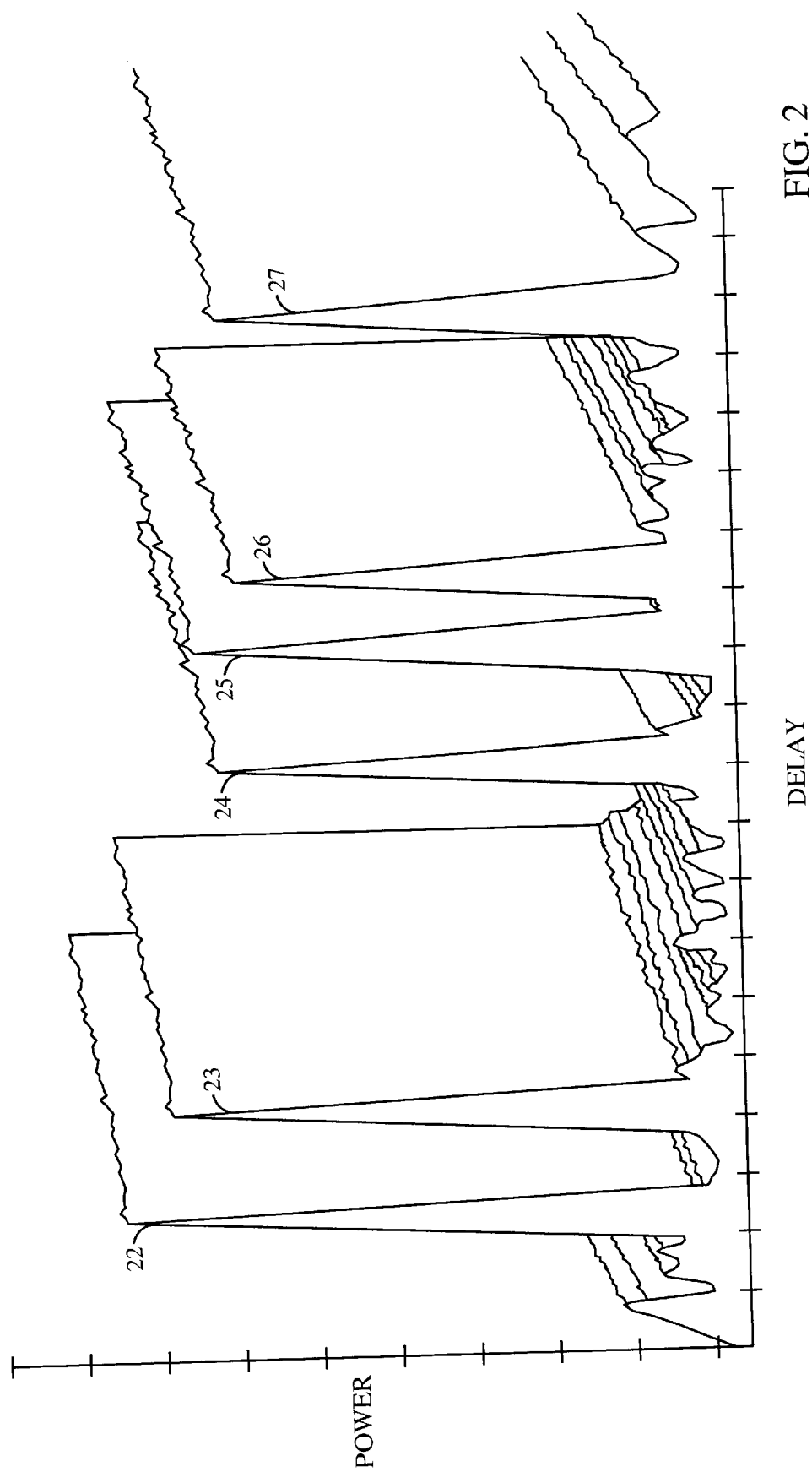
FIG. 2 is a graph showing an exemplifying set of multiple signal instances of a pilot signal from a single base station arriving at a remote unit.
Figure 3:
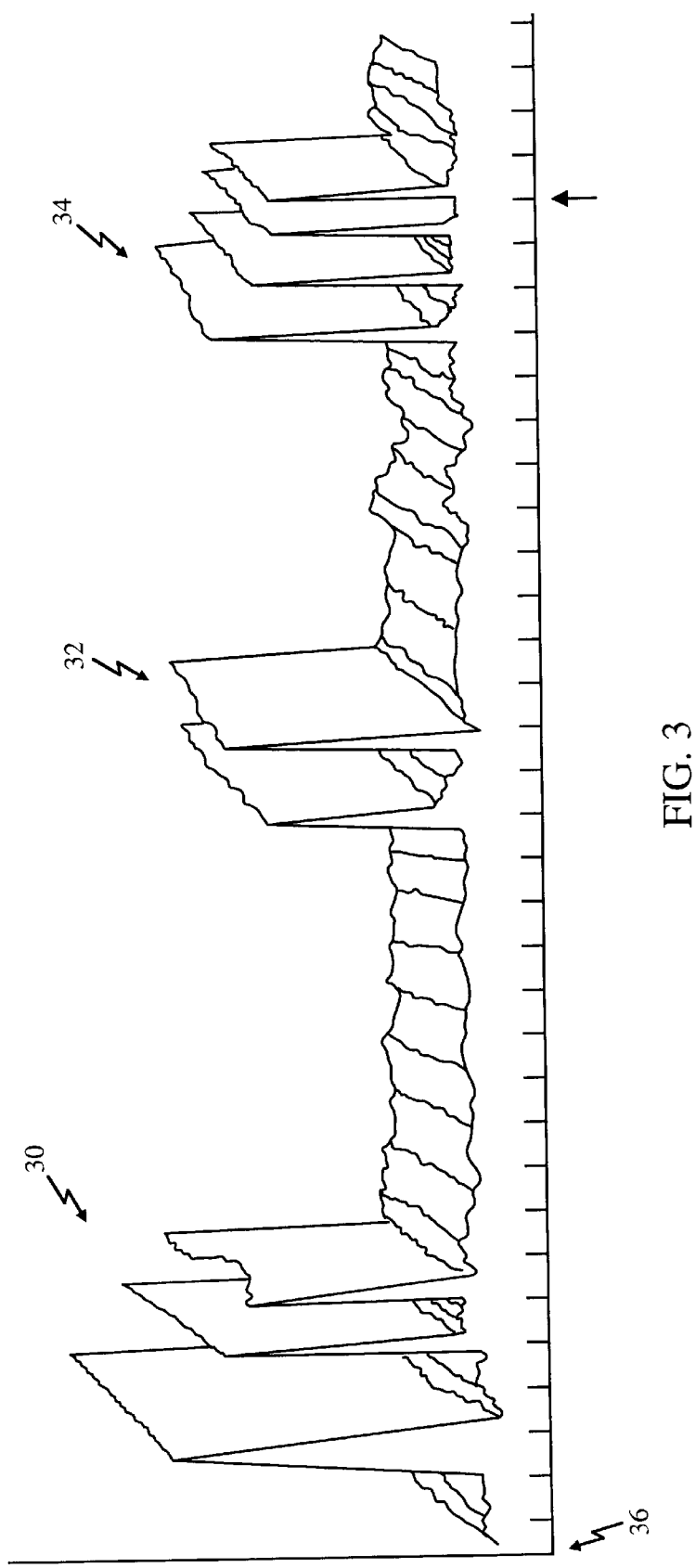
FIG. 3 is a graph showing an exemplifying set of multiple signal instances of pilot signals from multiple base stations arriving at a remote unit.
Figure 4:
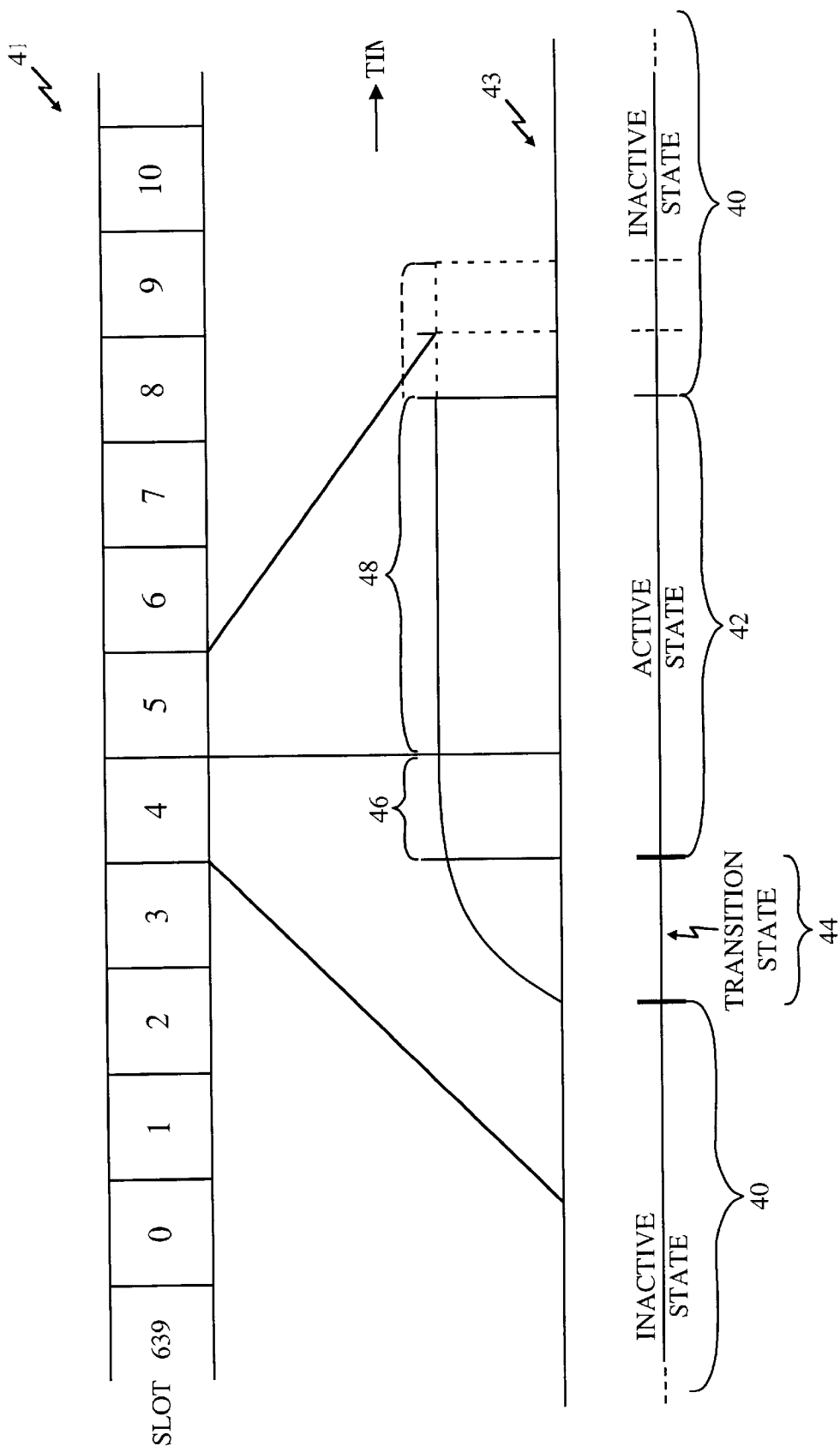
FIG. 4 is a representative diagram illustrating the transition from the inactive state to the active state at the assigned slot of a remote unit in a slotted mode communication system.

FIG. 4 shows a time line presented in two separate portions. An upper potion 41 represents a continual sequence of slots which flow in time from left to right. The lower portion 42 represents events occurring during a transition between active and inactive states of a remote unit in a slotted mode communication system in which slot 5 is an assigned slot. The time scale for the lower portion has been expanded so that the transition can be shown in more detail.

In particular, the lower portion 43 of FIG. 4 shows the transition from an inactive state 40 to an active state 42. In the active state 42, the remote unit monitors the base station signal during at least a portion of slot 5. Prior to the start of slot 5, the remote unit transits from the inactive state 40 to the active state 42 through a transition state 44. As described above, in the inactive state 40, selected circuitry in the remote unit is unpowered, reducing power consumption and extending battery life of the remote unit. For example, power may be removed from the search engine during the inactive state 40.

During the transition state 44, power is reapplied to the selected circuitry of the remote unit. For example, if the search engine is unpowered, power is reapplied thereto in the transition state 44. The duration of the transition state 44 is sufficient to allow the remote unit to power on circuits and initialize functions so that the remote unit is functional, allowing it to perform searches at the end of the transition state 44.

Following the transition state 44, the remote unit enters the active state 42. The active state 42 is made up of two parts: a preparation period 46 and an assigned slot period 48. During the preparation period 46, an initial search is performed reacquiring the pilot signal of the preferred base station so that the remote unit is prepared to monitor the paging channel during the assigned slot period 48. The assigned slot period 48 begins at the beginning of slot 5.

In one embodiment, the remote unit begins general searching for pilot signals from neighboring base stations only after entering the assigned slot period 48. In another embodiment, general searching for pilot signals from neighboring base stations begins while the remote unit is still in the preparation period 46, immediately following reacquisition and alignment with the preferred base station. During general searching, the remote unit can continue to measure the pilot signal strength of the preferred base station.

During the assigned slot period 48, the remote unit receives messages on the paging channel from the preferred base station. Nominally, at the completion of slot 5, the assigned slot period 48 and the active state 42 terminate and the remote unit enters the inactive state 40. In order to further reduce the power consumption of the remote unit, the base station may command the remote unit to enter the inactive state 40 before the completion of slot 5. Alternatively, if the base station cannot complete the transfer of messages during slot 5, the base station may command the remote unit to remain in the assigned slot period 48 after the completion of the slot. 5. Subsequently, the base station commands the remote unit to enter the inactive state 40. Searching terminates upon entering the inactive state 40 and power can be removed from the search engine.

Figure 5:
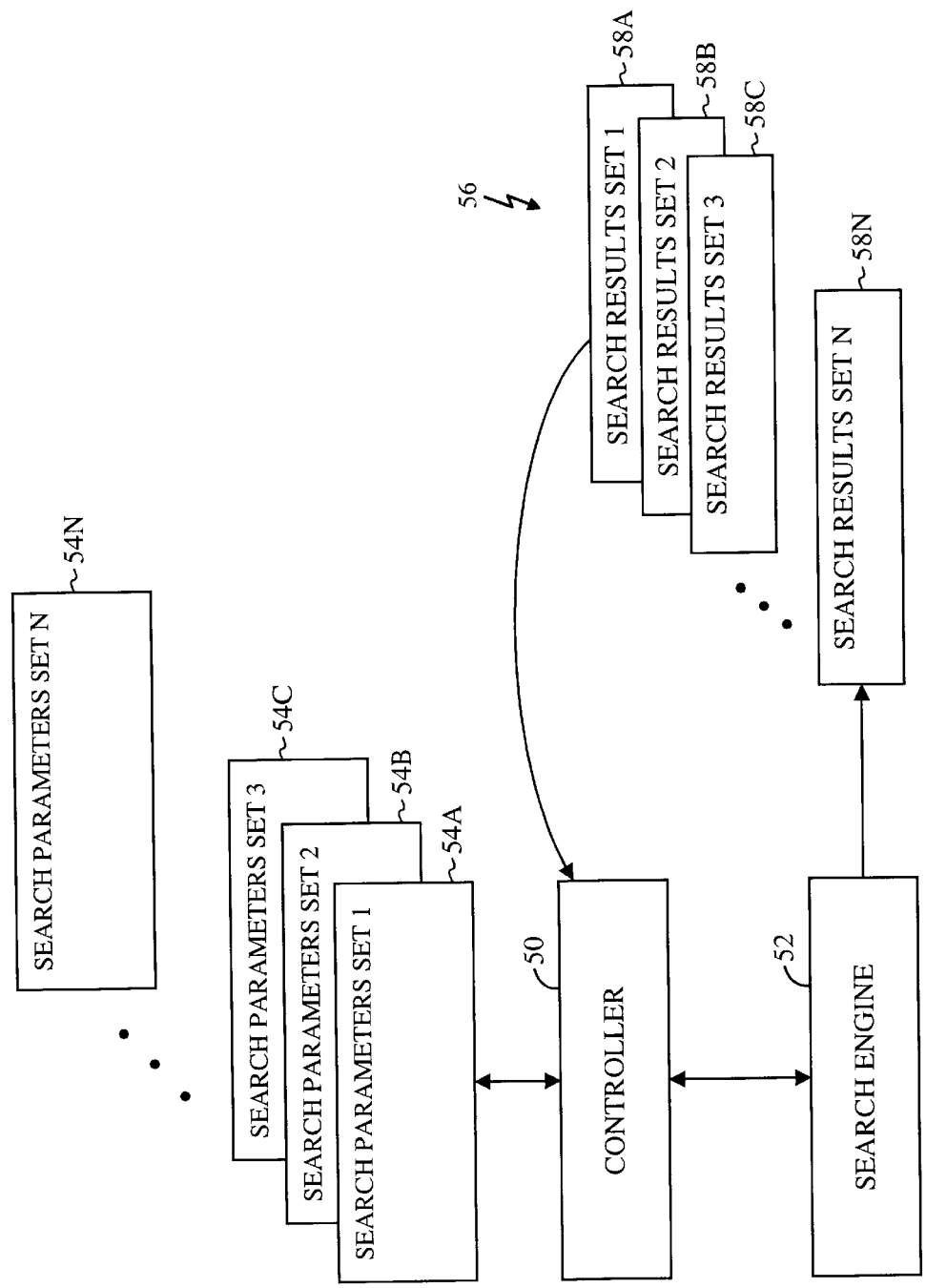
FIG. 5 is a block diagram of an embodiment of the present invention.

FIG. 5 illustrates one embodiment of the remote unit of the invention. The remote unit comprises a controller 50, a search engine 52 in communication with the controller, a plurality of search parameter sets 54A–N accessible by the controller, and a memory 56 for storing search result sets 58A–N. The controller 50 may be a microprocessor, an Application Specific Integrated Circuit (ASIC), a Field Programmable Gate Array (FPGA), discrete logic, analog circuitry, or other control circuitry. In one embodiment, after the remote unit enters the assigned slot period 48, the controller 50 passes a set of search parameters 54A to the search engine 52. The search engine using the set of search parameters 54A executes a search. At the completion of the search, the search engine 52 stores the set of search results 58A in memory 56. After storing the set of search results 58A, the search engine 52 notifies the controller 50 that it has completed the search. The controller then immediately passes a new set of search parameters 54B to the search engine 52. The search engine 52 uses the new set of search parameters 54B and executes a search. Following completion of the search, the search engine 52 stores the set of search results 58B in memory 56. After storing the search results 58B, the search engine 52 again notifies the controller 50 that the search has been completed. This process is continued as long as the remote unit remains in the assigned slot period 48, and is not interrupted for the purpose of analyzing the results of the search. When the remote unit exits the active state and re-enters the inactive state 40, the search engine 52 terminates searching and power to the search engine 52 may be removed. During the inactive state, the controller 50 evaluates the search results.

In another embodiment, the controller 50 passes sets of search parameters 54A–N to the search engine during the preparation period 46 before the assigned slot period 48. When the remote unit initially enters the preparation period 46 the reacquisition and alignment of the remote unit to the preferred base station is performed. Following reacquisition and alignment the search engine 52 begins performing searches prior to entry of the system into the assigned slot period 48. Searching continues during the assigned slot period 48, terminating when the remote unit exits the active state and re-enters the inactive state 40.

In the embodiments described above, during the inactive state 40, the controller 50 evaluates the search result sets 58A–N using techniques which are well known in the art. After evaluating the search result sets 58A–N, while in the inactive state 40, the controller modifies the search parameter sets 54A–N as desired for the search routine associated with the next active state 42. In one embodiment, the controller enters an inactive state 40 after determination of the next set of search parameters.

In another embodiment, a plurality of sets of search parameters may be passed from the controller 50 to the search engine 52. In this embodiment, the search engine 52 completes a search and stores the search results sets 58A–N in memory 56. The search engine 52 then proceeds to the next search without interrupting the controller 50. The search engine 52 continues searching until the remote unit enters the inactive state 40 and power is removed from the search engine 52. During the inactive state the controller 50 evaluates the search results 58A–N stored in memory 56.

In another embodiment, after evaluation of the stored search results and the determination of a new set of search parameters, the controller enters another "more inactive state." In the "more inactive state" additional circuitry in the remote unit has power removed, in addition to the circuitry which has power removed in the inactive state. For example, after the controller has read the search results from memory, the memory may enter an inactive state in which it consumes less power. In addition, after the controller has evaluated the search results from the previous active state and selected new search parameters to be used during the subsequent active state, the controller may also become inactive until the next active state of the remote unit is entered.

Figure 6:
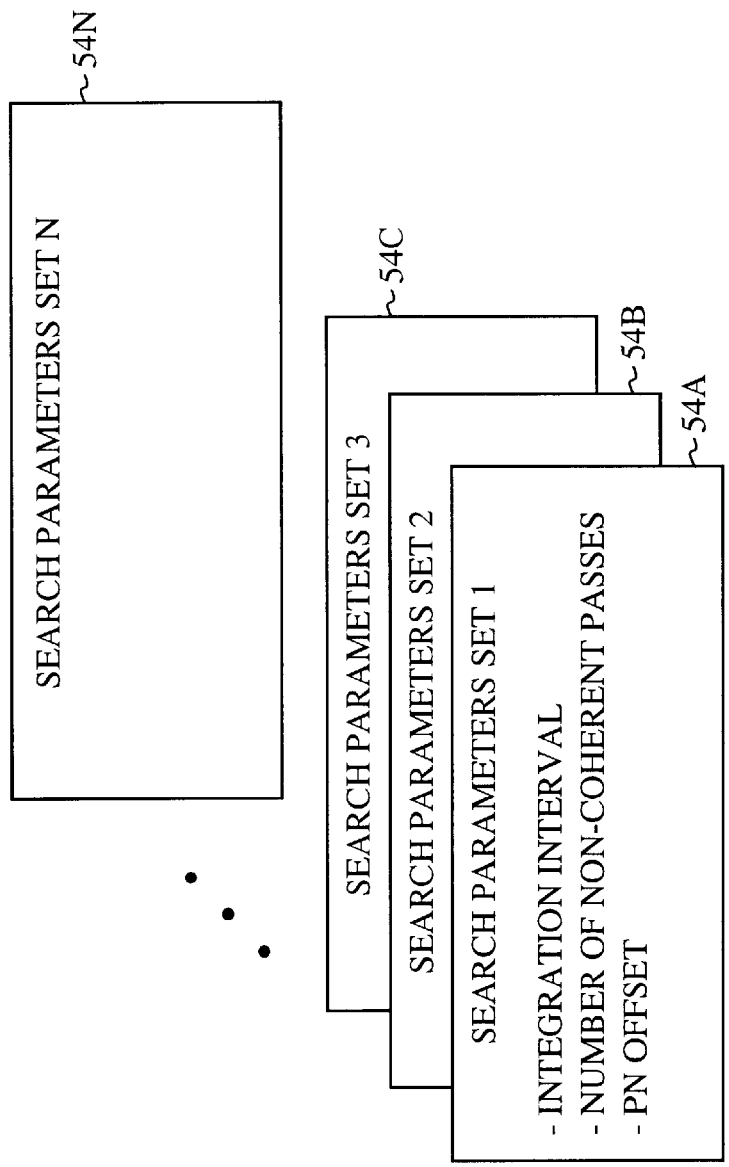
FIG. 6 is a representative diagram illustrating an embodiment of a search parameter set.

FIG. 6 shows a typical set of search parameters 54A–N. An individual search parameter set 54A comprises PN offset range, integration interval, and number of noncoherent passes as disclosed in U.S. patent application Ser. No. 09/346,368, entitled "CPU Load Control", assigned to the assignee of the present application and incorporated in its entirety herein by reference. As described above, during the inactive state 40 the controller 50 evaluates the search results acquired during the previous active state 42. After evaluating the search results the controller 50 may modify the set of search parameters for use during the next active state of the remote unit. Evaluation of search results by the controller 50 may result in new search parameters that, for example, rearrange the order in which portions of the PN space are searched, search different portions of PN space, or change integration interval or number of noncoherent passes during a search of a portion of the PN space.

Figure 7:
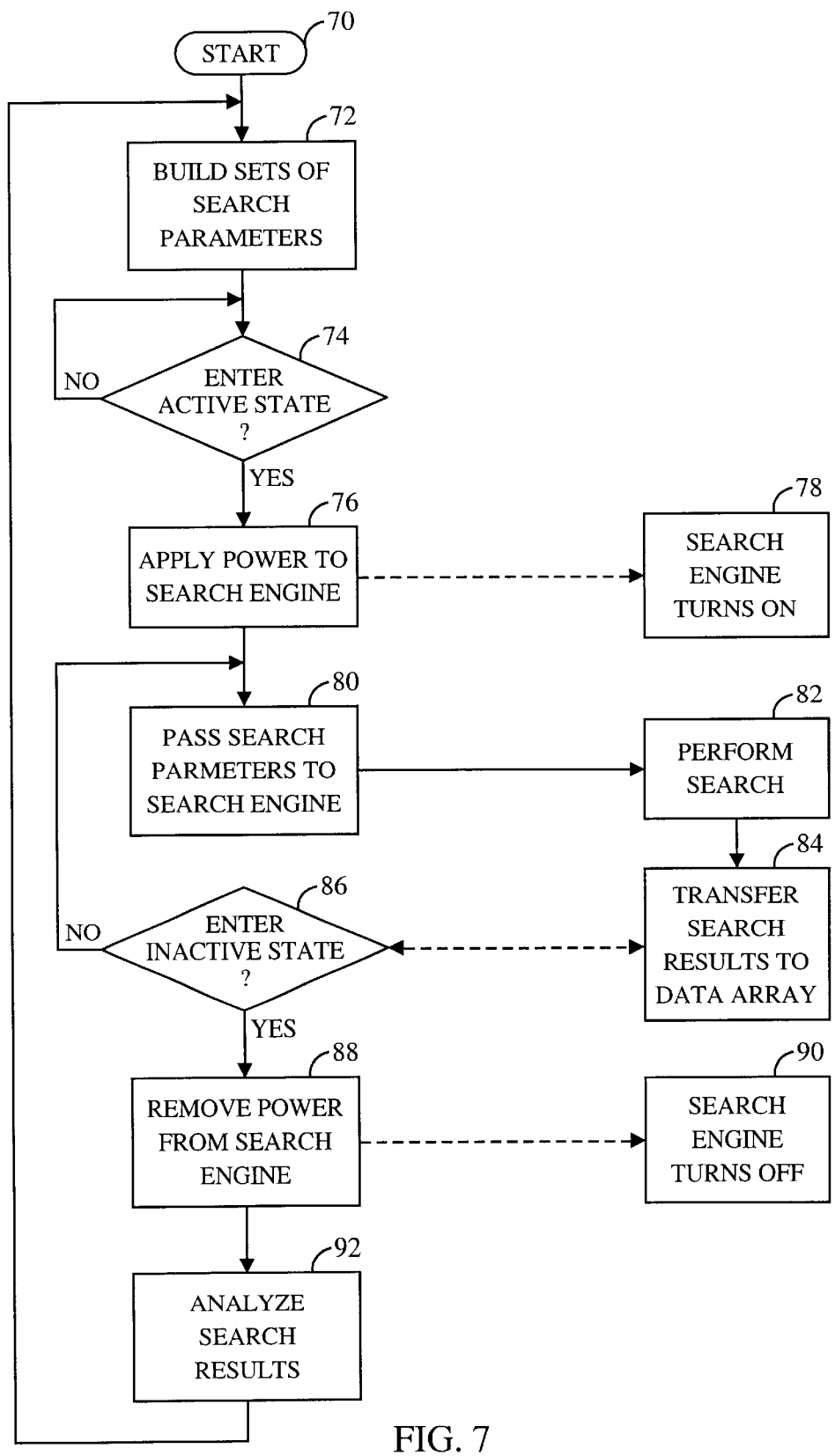
FIG. 7 is a flowchart illustrating the method of operation of one embodiment of the invention.

FIG. 7 is a flowchart illustrating the method of operation of one embodiment of the invention. In particular, it is noted that flow begins in block 70. In block 72 the controller builds sets of search parameters. As described above, search parameters may be modified based on previous search results or by receiving search parameters, particularly PN offset, from the preferred base station. Flow then continues to block 74. In block 74 the controller determines if the proper amount of time has passed since entering the inactive state and whether it is time to enter the active state. If it is not time to enter the active state flow remains in block 74. If it is time to enter the active state flow continues to block 76. In block 76 the controller directs the connection of power to be applied to the search engine. In block 78 the search engine turns on following application of power. Flow then continues to block 80.

In block 80 the controller passes search parameters to the search engine. In block 82 the search engine performs searches of PN space to identify PN offsets of potentially viable pilot signals. Flow continues to block 84 where the search engine transfers the search results to the data array and notifies the controller that the search is completed. Flow continues to block 86. In block 86, the controller determines if it should enter the inactive state. The remote unit may enter the inactive state by reaching the end of its assigned slot without being commanded to remain in the active state, or by being commanded to enter the inactive state by the preferred base station. If the remote unit does not enter the inactive state flow continues to block 80 and a new set of search parameters are passed to the search engine.

Referring again to block 86, if the remote unit is going to enter the inactive state flow continues to block 88. In block 88 the controller commands removal of power from the search engine. In block 90 the search engine turns off. Flow then continues to block 92 wherein the controller analyzes the search results. Flow then continues to block 72 wherein the controller may build new sets of search parameters based upon the analysis.

More information concerning the searching process, demodulating element assignment and search engines can be found in:

(1) U.S. Pat. No. 5,644,591, entitled METHOD AND APPARATUS FOR PERFORMING SEARCH ACQUISITION IN A CDMA COMMUNICATIONS SYSTEM;

(2) U.S. Pat. No. 5,805,648, entitled METHOD AND APPARATUS FOR PERFORMING SEARCH ACQUISITION IN A CDMA COMMUNICATIONS SYSTEM;

(3) U.S. Pat. Nos. 5,867,527 and 5,867,527, entitled METHOD OF SEARCHING FOR A BURSTY SIGNAL;

(4) U.S. Pat. No. 5,764,687, entitled MOBILE DEMODULATOR ARCHITECTURE FOR A SPREAD SPECTRUM MULTIPLE ACCESS COMMUNICATION SYSTEM;

(5) U.S. Pat. No. 5,577,022, entitled PILOT SIGNAL SEARCHING TECHNIQUE FOR A CELLULAR COMMUNICATIONS SYSTEM;

(6) U.S. Pat. No. 5,654,979, entitled CELL SITE DEMODULATION ARCHITECTURE FOR A SPREAD SPECTRUM MULTIPLE ACCESS COMMUNICATION SYSTEMS;

(7) Application Ser. No. 08/987,172, entitled MULTI CHANNEL DEMODULATOR, filed on Dec. 9, 1997; and (8) Application Ser. No. 09/283,010, entitled PROGRAMMABLE MATCHED FILTER SEARCHER, filed on Mar. 31, 1999; each of which is assigned to the assignee hereof and incorporated herein by reference, in its entirety.

In view of the above it will be appreciated that the invention overcomes longstanding problems in the technology by providing a more efficient method and apparatus for searching in a remote unit. Evaluation of the search results, by the controller, during the remote unit's inactive state rather than between searches results in more time being available for the search engine to perform searches. Because the search engine is not waiting for the controller to evaluate search results between consecutive searches, additional searches may be performed thereby improving the search efficiency in the remote unit.

Increasing the number of searches performed by the remote unit is beneficial in that it increases the robustness of the communication system. For example, additional searches enhance the remote unit's performance in detecting changes in the multipath environment and the effect of those changes on the preferred base station signal. In addition, more searching enhances the remote unit's determination of when a handoff should occur. These enhancements may result in improved performance by the remote unit, particularly as a remote unit moves from the coverage area of the preferred base station to the coverage area of a neighboring base station. The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. In a wireless remote unit having a search engine, a data array and a controller, a method of operating in slotted mode during which the remote unit monitors assigned slots among a plurality of slots in a repeating slot sequence, the method comprising:

building a set of search parameters to search a first assigned slot in the repeating slot sequence, the first assigned slot associated with an active state during which searching of the first assigned slot is to occur, the beginning of the next slot after the first assigned slot being associated with an inactive state during which no meaningful search data is available;

identifying the beginning of the active state and turning on the search engine;

passing the set of search parameters to the search engine;

performing, by the search engine, searching of the first assigned slot;

storing a set of search results in the data array;

identifying the inactive state;

removing power from the search engine; and retrieving and analyzing the set of search results (i) after removing power from search engine, (ii) while still in an inactive state of slotted mode operation, and (iii) before a second assigned slot in the sequence is received.

2. The method of claim 1, wherein after analyzing the search results, the method further comprising:

generating, by the controller, a new set of search parameters to be applied to the second assigned slot.

3. The method of claim 2, wherein the new set of search parameters includes modifying at least one of an integration interval, a number of coherent passes, and pn offset parameters.

4. The method of claim 2, wherein the wireless remote unit is a CDMA wireless communication device.

5. The method of claim 2, wherein while in an inactive state, select circuitry is powered down.

6. The method of claim 5, wherein in response to analyzing the set of search results, further comprising:

entering a more inactive mode whereby additional select circuitry is powered down.

7. The method of claim 1, wherein the building a set of search parameters includes generating at least one of an integration interval, a number of coherent passes, and pn offset parameters.

8. A wireless communication device operable in slotted mode during which the device monitors assigned slots among a plurality of slots in a repeating slot sequence, the device comprising:

means for building a set of search parameters to search a first assigned slot in the repeating slot sequence, the first assigned slot associated with an active state during which searching of the first assigned slot is to occur, the beginning of the next slot after the first assigned slot being associated with an inactive state during which no meaningful search data is available;

means for identifying the beginning of the active state and turning on search engine;

means for passing the set of search parameters to the search engine;

means for performing searching of the first assigned slot;

means for storing a set of search results in a data array;

means for identifying the inactive state;

means for removing power from the search engine; and means for retrieving and analyzing the set of search results (i) after removing power from search engine, (i) while still in an inactive state of slotted mode operation, and (ii) before a second assigned slot in the sequence is received.

9. The device of claim 8, further comprising:

means for generating a new set of search parameters to be applied to the second assigned slot after analyzing the search results.

10. The device of claim 9, wherein the means for generating a new set of search parameters includes means for modifying at least one of an integration interval, a number of coherent passes, and pn offset parameters.

11. The device of claim 8, wherein the means for building a set of search parameters includes means for generating at least one of an integration interval, a number of coherent passes, and pn offset parameters.

12. The device of claim 8, wherein the wireless communication device is a CDMA wireless communication device.

13. The device of claim 8, further comprising means for powering down select circuitry while in an inactive state.

14. The device of claim 13, further comprising:

means for entering a more inactive mode whereby additional select circuitry is powered down in response to analyzing the set of search results.

15. A processor-readable media including programmable instructions operable in a wireless remote unit having a search engine, a data array and a controller, and operable in slotted mode during which the remote unit monitors assigned slots among a plurality of slots in a repeating slot sequence, the instructions causing the remote unit to:

build a set of search parameters to search a first assigned slot in the repeating slot sequence, the first assigned slot associated with an active state during which searching of the first assigned slot is to occur, the beginning of the next slot after the first assigned slot being associated with an inactive state during which no meaningful search data is available;

identify the beginning of the active state and turn on the search engine;

pass the set of search parameters to the search engine;

perform searching of the first assigned slot;

store a set of search results in the data array;

identify the active state;

remove power from the search engine; and retrieve and analyze the set of search results (i) after removing power from search engine, (ii) while still in an inactive state of slotted mode operation, and (iii) before a second assigned slot in the sequence is received.

16. The processor-readable media of claim 15, further comprising instructions to:

generate a new set of search parameters to be applied to the second assigned slot after analyzing the search results.

17. The processor-readable media of claim 16, wherein the instruction to generate the new set of search parameters includes instructions to modify at least one of an integration interval a number of coherent passes, and pn offset parameters.

18. The processor-readable media of claim 15, wherein the instructions for building a set of search parameters includes instructions for generating at least one of an integration interval, a number of coherent passes, and pn offset parameters.

19. The processor-readable media of claim 15, wherein the wireless remote unit device is a CDMA wireless communication device.

20. The processor-readable media of claim 15, further comprising instructions for powering down select circuitry while in an inactive state.

21. The processor-readable media of claim 20, further comprising:

instructions for entering a more inactive mode whereby additional select circuitry is powered down in response to analyzing the set of search results.

* * * * *